United States Patent [19]
Honma et al.

[11] Patent Number: 6,034,783
[45] Date of Patent: Mar. 7, 2000

[54] IMAGE FORMING APPARATUS AND METHOD AND INFORMATION PROCESSING SYSTEM AND METHOD

[75] Inventors: Masayuki Honma, Tokyo; Michiharu Masuda, Numazu; Hisatsugu Tahara, Kawasaki; Yasuki Nakajima, Yokohama, all of Japan

[73] Assignee: Canon Kabushiki Kaisha, Tokyo, Japan

[21] Appl. No.: 08/904,538

[22] Filed: Aug. 4, 1997

[30] Foreign Application Priority Data

Aug. 6, 1996 [JP] Japan .................................... 8-207050

[51] Int. Cl.$^7$ ..................................................... G06K 15/00
[52] U.S. Cl. ........................................ 358/1.16; 358/1.12
[58] Field of Search ..................................... 395/101, 112, 395/113, 115, 116, 111, 834, 872, 873, 876, 877; 358/404, 444

[56] References Cited

U.S. PATENT DOCUMENTS 5,682,248 10/1997 Yoshida .................................. 358/404

*Primary Examiner*—Arthur G. Evans
*Attorney, Agent, or Firm*—Fitzpatrick, Cella, Harper & Scinto

[57] ABSTRACT

An image forming apparatus has a reversing unit for reversing a sheet with an image formed and discharging the reversed sheet, a determining unit for determining whether the sheet with an image formed is reversed or not reversed with the reversing unit before the sheet is discharged and a page order control unit including a first mode of forming images of a plurality of pages in a first page mode and a second page mode of forming images of a plurality of pages in a second page mode different from the first page mode, wherein in accordance with whether the apparatus operates in the first mode or in the second mode, the determining unit determines whether the sheet with an image formed is reversed or not reversed with the reversing unit before the sheet is discharged.

32 Claims, 8 Drawing Sheets

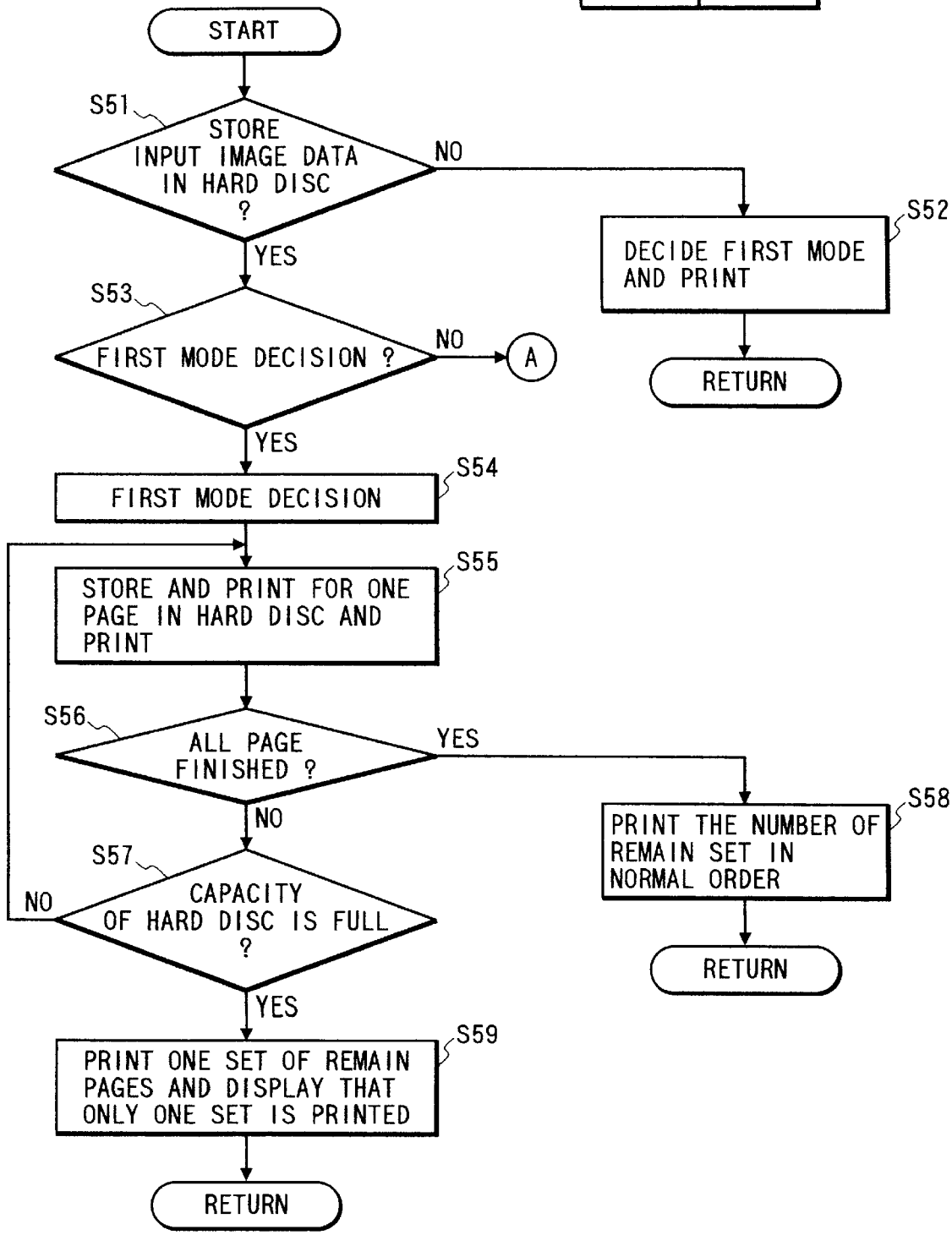

IMAGE FORMING APPARATUS AND METHOD AND INFORMATION PROCESSING SYSTEM AND METHOD

BACKGROUND OF THE INVENTION

1. Field of the Invention

The present invention relates to an image forming apparatus such as a copier with an electronic sorting function and an image forming method, and to an information processing method and system.

2. Related Background Art

A digital copier with an electronic sorting function is known in which all images are read and stored once in a memory such as a hard disk and thereafter image data of desired originals is read and printed out. Copies of desired originals can therefore be obtained without using a sorter unit having a plurality of bins.

An electronic sorting function which can use PDL (page description language) data is also known in which a digital copier receives, from a network, PDL data formed by an application at a host computer, develops it into bit map images and stores them once in a memory such as a hard disk, and thereafter desired images are read from the memory to print them out in a sorted state.

PDL data formed by an application is sent from a host computer to a digital copier, generally in the order from the start page to the last page. Therefore, in order to print out copies in a face-up state and in a binding order, it is necessary to print out each page in a reverse order. Therefore, developed images are required to be stored once in a memory such as a hard disk and thereafter images are read from the memory in the order from the last page to the first page to print them out in a binding order.

Any hard disk has a capacity limit so that this capacity may become full while images are sequentially read from the start page. For example, assuming that PDL data has a total amount of 120 pages and the capacity of a hard disk becomes full when first to 100th pages are stored, it is not possible to continuously output 120 pages in a face-up state and in the reverse order. When the capacity of the hard disk becomes full, the following operations may be performed. One is to automatically cancel the print job. Another is to first print out first to 100th pages in a face-up state for the requested number of sheets per page, and then to store 101st to 120th pages in the hard disk and read these pages in a reverse order from the hard disk to print them out in a face-up state for the requested number of sheets per page.

However, with the above operations, all necessary pages cannot be sequentially printed out after the capacity of a memory such as a hard disk becomes full.

SUMMARY OF THE INVENTION

It is an object of the present invention to provide an image forming apparatus and method and an information processing system and method, capable of printing out all necessary pages in a binding order even if the capacity of a memory such as a hard disk becomes full while storing PDL developed images in the memory.

An image forming apparatus of this invention provided with an electronic sorting function for reading image data of an original, temporarily storing the image data in a storage unit, repetitively reading desired image data from the storage unit, and printing out the read image data, comprises: first control means for temporarily storing the image data sequentially from the start page to the last page thereof into the storage unit, reading the image data stored in the storage unit sequentially from the last page toward the start page, and printing the read image data on a sheet in a reverse order with the printed face of the sheet being turned upward; second control means for reading the image data stored in the storage unit sequentially from the start page and printing the read image data in a normal order with a printed face being turned downward, if the capacity of the storage unit becomes full while the image data is stored by the first control means in the storage unit; and third control means for printing the image data of a remaining page not stored in the storage unit in the normal order with the printed face turned downward, without storing the image data in the storage unit, after the process executed by the second control means.

Preferably, the image forming apparatus includes first display control means for displaying executions of the second and third control means on a display unit provided in the image forming apparatus.

An image forming method of this invention for reading image data of an original, temporarily storing the image data in a storage unit, repetitively reading desired image data from the storage unit, and printing out the read image data, comprises the steps of: temporarily storing the image data sequentially from the start page to the last page thereof into the storage unit, reading the image data stored in the storage unit sequentially from the last page toward the start page, and printing the read image data on a sheet in a reverse order with the printed face of the sheet being turned upward; reading the image data stored in the storage unit sequentially from the start page and printing the read image data in a normal order with a printed face being turned downward, if the capacity of the storage unit becomes full while the image data is stored in the storage unit; and printing the image data of a remaining page not stored in the storage unit in the normal order with the printed face turned downward, without storing the image data in the storage unit.

Preferably, execution results are displayed on a display unit provided in an image forming apparatus.

An information processing system of this invention for receiving data sent from a master apparatus at a slave apparatus, temporarily storing the received data in a storage unit, repetitively reading desired data from the storage unit, and printing out the read data, comprises: developing means provided in the slave apparatus for developing the data sent from the master apparatus into a bit map image; first control means for temporarily storing the developed data sequentially from the start page to the last page thereof into the storage unit, reading the data stored in the storage unit sequentially from the last page toward the start page, and printing the read data on a sheet in a reverse order with the printed face of the sheet being turned upward; second control means for reading the data stored in the storage unit sequentially from the start page and printing the read data in a normal order with a printed face being turned downward, if the capacity of the storage unit becomes full while the data is stored by the first control means in the storage unit; and third control means for printing the data of a remaining page not stored in the storage unit in the normal order with the printed face turned downward, without storing the data in the storage unit, after the process executed by the second control means.

Preferably, the information processing system includes second display control means for displaying executions of the second and third control means on a display unit provided in the slave apparatus.

Preferably, the information processing system includes third display control means for displaying executions of the second and third control means on a display unit provided in the master apparatus.

An information processing method of this invention for receiving data sent from a master apparatus at a slave apparatus, temporarily storing the received data in a storage unit, repetitively reading desired data from the storage unit, and printing out the read data, comprises the steps of: developing the data sent from the master apparatus into a bit map image at the slave apparatus; temporarily storing the developed data sequentially from the start page to the last page thereof into the storage unit, reading the data stored in the storage unit sequentially from the last page toward the start page, and printing the read data on a sheet in a reverse order with the printed face of the sheet being turned upward; reading the data stored in the storage unit sequentially from the start page and printing the read data in a normal order with a printed face being turned downward, if the capacity of the storage unit becomes full while the data is stored in the storage unit; and printing the data of a remaining page not stored in the storage unit in the normal order with the printed face turned downward, without storing the data in the storage unit.

Preferably, the information processing method displays execution results on a display unit provided in the slave apparatus.

Preferably, the information processing method displays execution results on a display unit provided in the master apparatus.

The master apparatus may be a host computer and the slave apparatus may be a digital copier provided with an electronic sorting function. The storage unit may be constituted of a communication controller and a hard disk into which data is written in accordance with a command from the communication controller.

Other objects and advantages of the present invention will become apparent from the following detailed description, claims and accompanying drawings.

BRIEF DESCRIPTION OF THE DRAWINGS

FIGS. 6 and 7A and 7B are flow charts illustrating the processes to be executed by other embodiments of the invention.

DETAILED DESCRIPTION OF THE PREFERRED EMBODIMENTS

Figure 4:
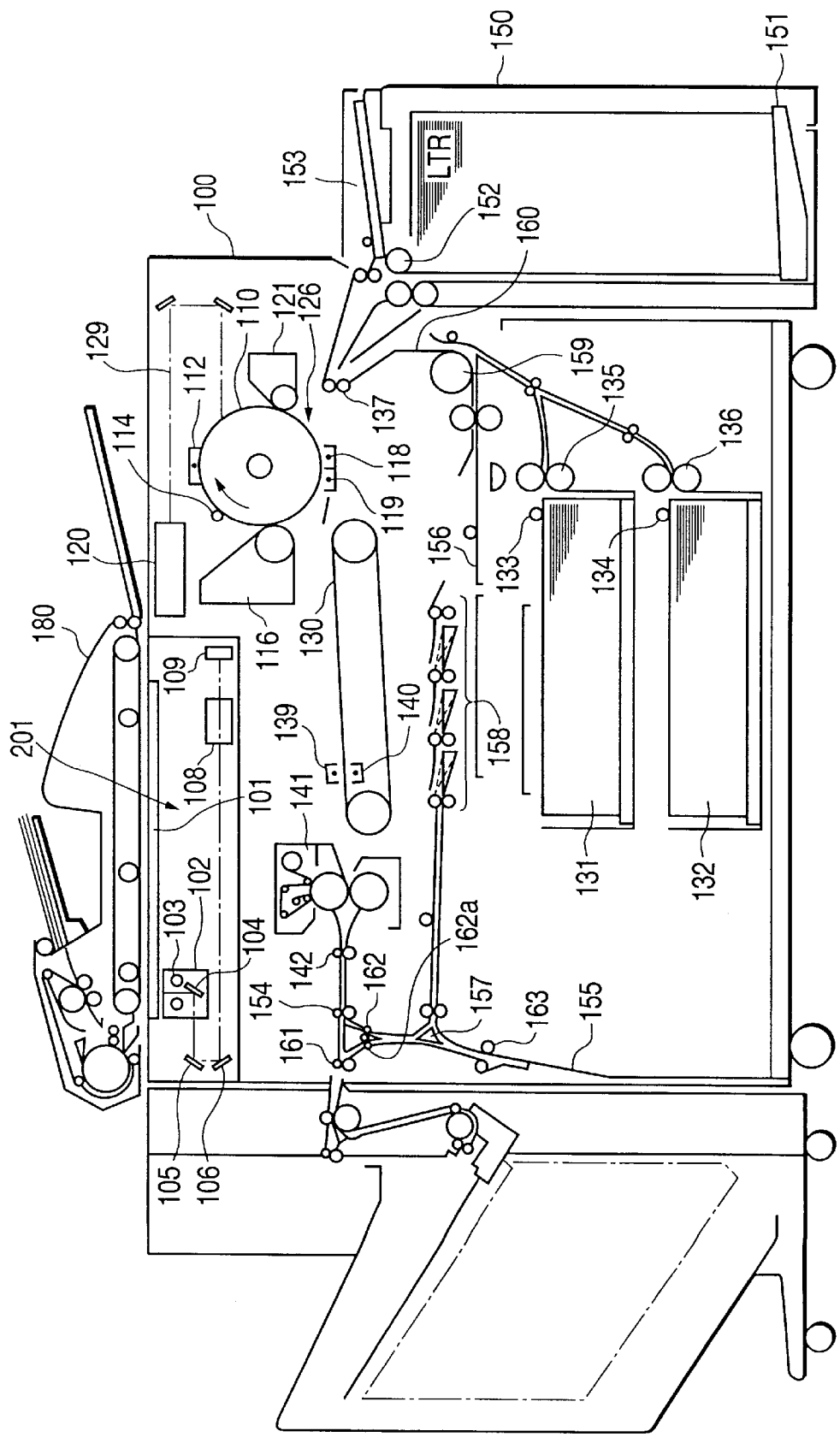
FIG. 4 is a side view showing an example of the structure of an image forming apparatus constituted of a digital copier with an electronic sorting function.

Embodiments of the invention will be described with reference to the accompanying drawings. First, the overall structure of the embodiment apparatus will be described briefly with reference to FIG. 4. FIG. 4 shows a digital copier with an electronic sorting function, as one example of the image forming apparatus of this invention. Reference numeral 100 represents a main body of a copier, and reference numeral 180 represents a cyclical and automatic original feeder (RDF).

Referring to FIG. 4, an image read unit 201 is mounted on the upper portion of the copier main body 100. This image read unit 201 is constituted of a platen glass 101 serving as an original support base, a scanner 102, an original illuminating lamp 103, a scanning mirror 104 and the like. The scanner is reciprocally scanned in predetermined directions by an unrepresented motor so that light reflected from an original is focussed onto a CCD sensor 109 via scanning mirrors 104 to 106 and a lens 108.

Reference numeral 120 represents an exposure control unit constituted of a laser, a polygon mirror and the like. An image picked up with an image sensor 109 is converted into an electric signal which is subjected to predetermined image processing. The processed image signal modulates a laser beam 129 which is then applied to a photosensitive drum 110.

Disposed around this photosensitive drum 110 are a primary charger 112, a developing unit 121, a transfer charger 118, a cleaning unit 116 and a pre-exposure lamp 114. In an image forming unit 126 the photosensitive drum 110 is rotated by an unrepresented motor in the direction indicated by an arrow, and charged to a desired potential with the primary charger 112. Thereafter, the laser beam 129 from the exposure control unit 120 is applied to the photosensitive drum 110 to form an electrostatic latent image. This latent image formed on the photosensitive drum 110 is developed with the developed unit 121 to be visualized as a toner image. A transfer sheet fed from an upper stage cassette 131 or lower stage cassette 132 via pickup rollers 133 and 134 is transported by feed rollers 135 and 136 to the copier main body. In this copier main body, the transfer sheet is fed to a transfer belt 130 by a resist roller 137 and the visualized toner image is transferred to the transfer sheet by the transfer charger 118. After this transfer, the cleaning unit 116 removes resident toner on the photosensitive drum 110 and the pre-exposure lamp 114 erases residual charges on the photosensitive drum 110.

The transfer sheet with the toner image is separated from the transfer belt 130, and the toner image is re-charged by pre-fix chargers 139 and 140 and sent to a developing unit 141 where the toner image is fixed through pressure and heat. The transfer sheet is thereafter discharge from the copier main body 100 by a discharge roller 142.

Reference numeral 118 represents a suction charger for making a transfer sheet sent from the resist roller 137 be sucked to the transfer belt. Reference numeral 119 represents a transfer charger used in combination with the suction charger 118 for sucking the transfer sheet to the transfer belt 130 and charging it.

The copier main body 100 is equipped with a deck 150 capable of housing transfer sheets, e.g., 4000 transfer sheets. A lifter 151 of the deck 150 functions to make a paper feed roller 152 always abut against the transfer sheets, and rises its level in accordance with the amount of transfer sheets. A multi-manual-feeder 153 capable of housing one hundred transfer sheets is also mounted on the copier main body 100.

In FIG. 4, reference numeral 154 represents a paper discharge flapper which selects either a both-side recording side, a multi-recording side, or a paper discharge side. This paper discharge flapper 154 directs a transfer sheet transported by the paper discharge roller 142 to the both-side recording side or multi-recording side. Reference numeral 158 represents a lower transport path which directs a transfer sheet transported by the paper discharge roller 142 and turned upside down by a reverse path 155, to a paper re-feeder tray 156. Reference numeral 157 represents a multi-flapper for switching between a both-side recording path and a multi-recording path. If this multi-flapper is turned to the left, a transfer sheet is directly sent to the lower transport path 158 without passing through the reverse path 155. Reference numeral 159 represents a paper feed roller for feeding a transfer sheet via a path 160 to the photosensitive drum 162. Reference numeral 161 represents a discharge roller disposed near the paper discharge flapper 154 for discharging the transfer sheet set to the discharge side by the paper discharge flapper 154, to the outside of the copier main body. For the both-side recording (both-side copying), the paper discharge flapper 154 is raised and the multi-flapper 157 is turned to the right to thereby introduce a transfer sheet with its one side being copied to the reverse path 155, and thereafter the multi-flapper 157 is turned to the left to load the reversed transfer sheet into the paper re-feed tray 156 via the transport path 158. For the multi-recording, the paper discharge flapper 154 is raised and the multi-flapper is turned to the left to thereby load the copied transfer sheet into the paper re-feed tray 156 via the transport path 158. The transfer sheets loaded in the paper re-feed tray 156 are directed, one sheet after another from the bottom, by the paper feed roller 159 to the resist roller 137 of the copier main body 100 via the path 160.

When a transfer sheet is discharged in a reversed state from the copier main body 100, i.e., when a transfer sheet is discharged in a face-down state, the paper discharge flapper 154 is raised and the flapper 157 is turned to the right to transfer the copied transfer sheet to the transport path 155, and after the back end of the transfer sheet passes through a first feed roller 162, the transfer sheet is directed by a reverse roller 163 to a second feed roller 162a and discharged by the discharge roller 161 in a face-down state.

Figure 1:
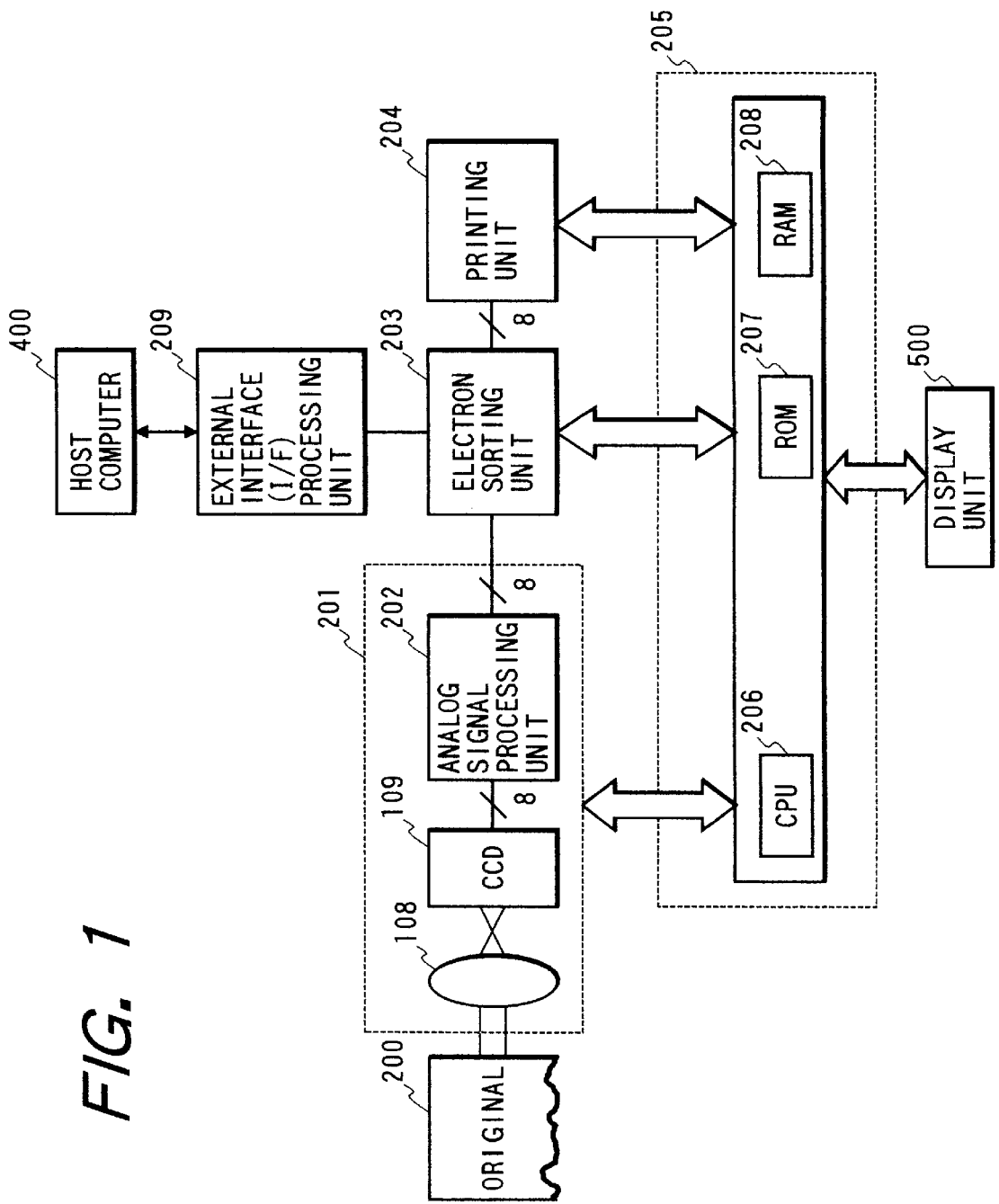
FIG. 1 is a block diagram showing an outline of the structure of an image forming apparatus according to an embodiment of the invention.

Next, the electrical structure of an image forming apparatus of the invention will be described with reference to FIGS. 1 to 3.

First, the structure of an image forming apparatus shown in FIG. 1 will be described. In FIG. 1, an image read unit 201 is constituted of a CCD sensor, an analog signal processing unit 202, a lens 108 and the like. An image of an original 200 focussed onto the CCD sensor 109 is converted into an analog electric signal. The converted image information is supplied to the analog signal processing unit 202 whereat it is subjected to signal processing such as sample-hold and dark level correction and thereafter it is A/D converted into a digital signal. This digital signal is subjected to shading correction (correction of a sensitivity variation of an original reading sensor, correction of light distribution characteristics of an original illumination lamp, and the like) and variable magnification, and thereafter input to an electronic sorting unit 203.

The electronic sorting unit 203 processes an input digital image signal. The processes include correction processes required in an output side, e.g., gamma correction, a smoothing process, an edge emphasis process, and other necessary processes and modifications. The processed signal is output to a printer unit 204.

The printer unit 204 is constituted of an exposure control unit 120 made of a laser and the like described with FIG. 4, an image forming unit 126, a transfer sheet transport control unit, and the like. The printer unit 204 prints an image on a transfer sheet in accordance with the received image signal.

A CPU circuit unit 205 is constituted of a CPU 206, a ROM 207, a RAM 208 and the like, and controls the image read unit 201, electronic sorting unit 203, printer unit 204 and the like to collectively control the operation sequence of the apparatus.

An external interface (I/F) processing unit 209 develops PDL data input from an external host computer 400 into bit map images which are input to the electronic sorting unit 203. Conversely, image print results such as jam occurrence information is supplied to the external host computer via the external interface processing unit 209.

Figure 2:
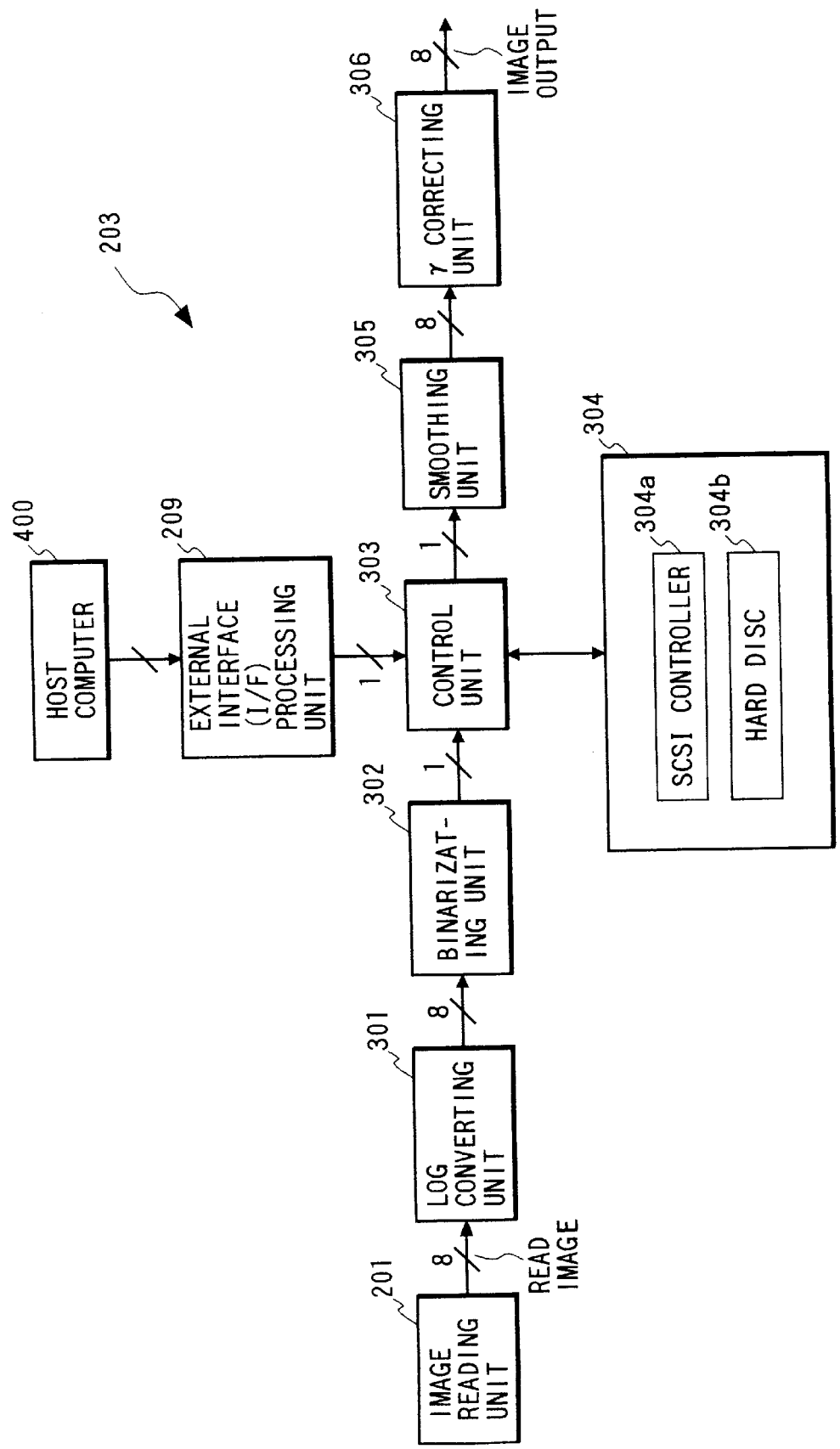
FIG. 2 is a block diagram showing the internal structure of an electronic sorter.
Figure 3:
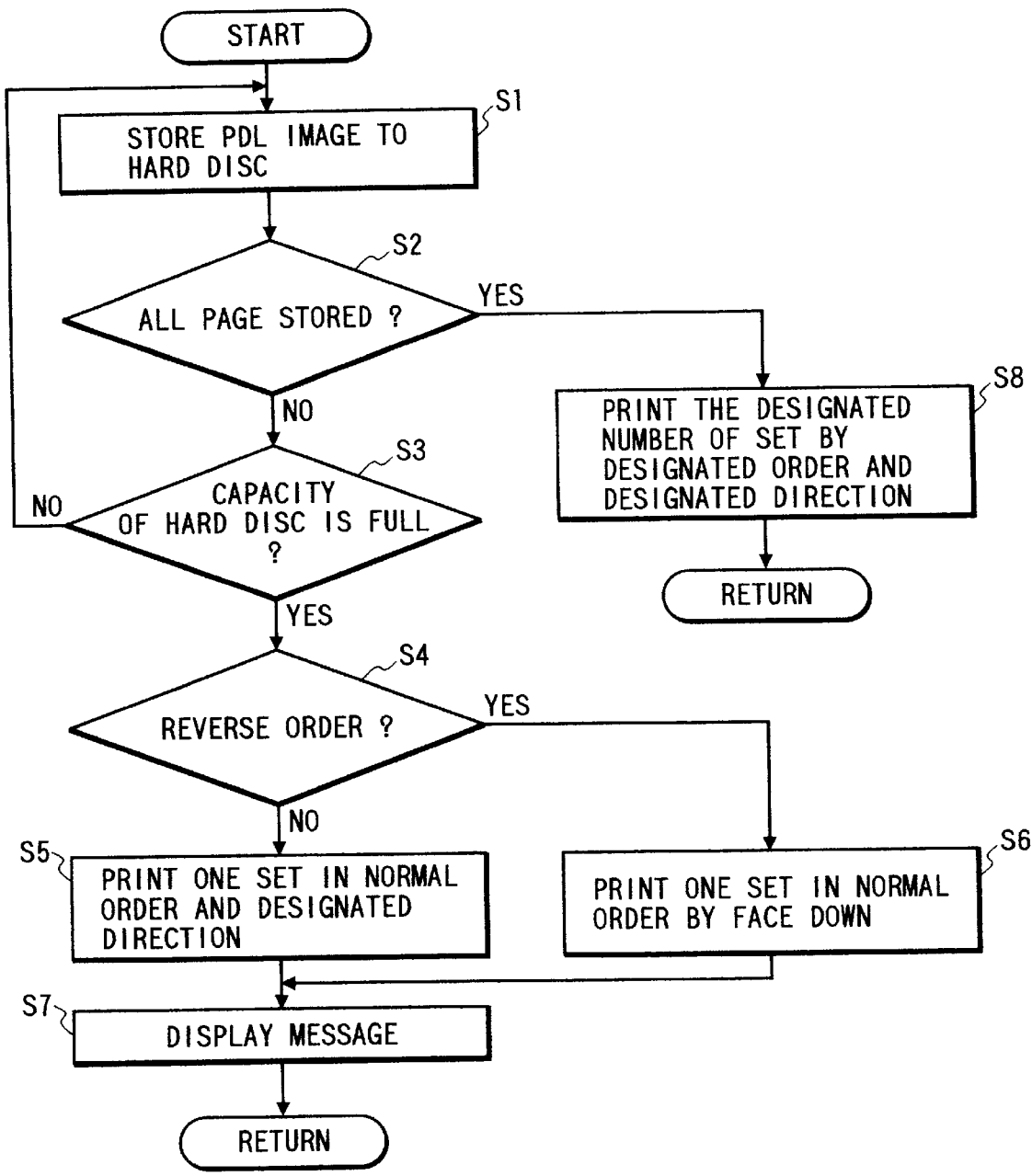
FIG. 3 is a flow chart illustrating an example of an image forming process.

FIG. 2 shows the details of the electronic sorting unit 203. An image sent from the image read unit 201 is sent to a log converting unit 301 as black luminance data. The log converting unit 301 has a look-up table LUT to be used for converting input luminance data into density data which is output to a binarizing unit 302.

The binarizing unit 302 binarizes multi-value density data into one of density values "0" and "255". The binarized 8-bit image data is therefore converted into one-bit image data of "0" or "1" so that the image data amount to be stored in a memory can be reduced.

However, after an image is binarized, the number of tonal levels of the image changes from 256 levels to 2 levels. If image data having a large part of half-tone such as photographic image data is binarized, its image quality is considerably degraded. It is therefore necessary to use pseudo half-tone of binary data. In this example, as pseudo half-tone of binary data, an error dispersion method is used. With this method, a density larger than a predetermined threshold value is considered as density data "255", whereas a density equal to or smaller than the threshold value is considered as density data "0". After this binarization, an error signal between the actual density data and binarized density data is distributed to peripheral pixels. Error distribution is performed by multiplying a binarization error by a weight coefficient on a matrix prepared beforehand and by adding the multiplied result to peripheral pixels. In this manner, an average density of an image as a whole can be retained and a half-tone can be represented by binary data in a pseudo manner.

The binarized image data is sent to a control unit 303, or binarized image data may be supplied from the external interface processing unit 209. The bit map image data developed from the PDL data sent from the host computer 400 is directly sent to the control unit 303 because it is already processed as binary image data in the external interface processing unit 209.

In response to a command from the copier main body 100, the control unit 303 temporarily stores bit map images of an original read from RDF or bit map images of developed PDL from the external interface processing unit, into an image storage unit 304, and sequentially reads the image data from this image storage unit 304.

The image storage unit 304 has an SCSI controller 304a and a hard disk 304b. In accordance with a command from the SCSI controller 304a, image data is written in the hard disk 304b. A plurality of image data sets stored in the hard disk 304b are printed out in the order corresponding to an edit mode designated by an operation unit of the copier. For example, for a sorting mode, image data of originals is sequentially read from RDF in the order from the last page to the first page and printed out while storing it in the hard disk 304b. For the second and following sets of originals, the same image data of originals are read from the hard disk 304b in the order from the last page to the first page and printed out. In this manner, without using a plurality of paper discharge bins, a plurality of copied original sets in a sorted manner can be obtained.

PDL data to be sent from the host computer 400 generally starts from the first page. In printing a PDL image in a reverse order, bit map image data of PDL data of all pages sent from the host computer is once loaded in the hard disk 304b, and then the image data is sequentially read from the hard disk 304b in the order from the last page to the first page and printed out.

Image data read from the image storage unit 304 or image data not stored in the image storage unit 304 is sent to a smoothing unit 305. The smoothing unit 305 converts the one-bit data into 8-bit data and makes the image data signal in "0" or "255" state.

The converted image data is replaced by a weighted average value which is a sum of density values of peripheral pixels multiplied by corresponding coefficients on a matrix prepared beforehand. In this manner, the binary data is converted into multi-value data in accordance with the density values of peripheral pixels, and the image quality more similar to the read image can be reproduced. The smoothed image data is input to a gamma correcting unit 306 which converts the density data by using LUT prepared by considering the printer characteristics in order to adjust the imaged data output in accordance with the density values designated by the operation unit.

Figure 5:
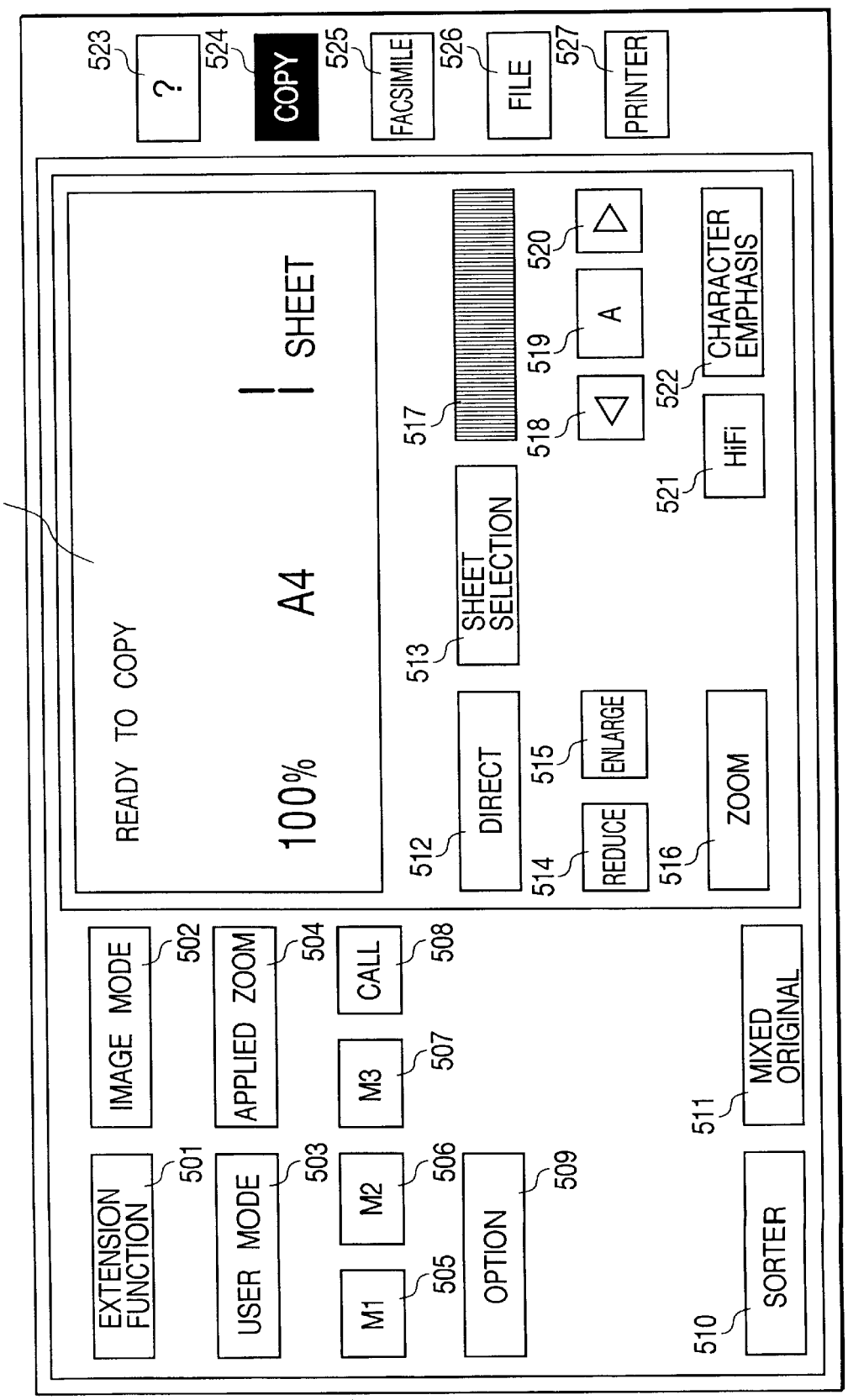
FIG. 5 is a diagram showing an example of a display on a display unit.

Next, with reference to FIG. 5, the structure of a display unit 500 of the image forming apparatus of the invention will be described.

This display unit has a touch panel for executing a function displayed in each frame in response to a user touching the inside of each frame.

A copy mode key 524 is pushed when a copy operation is to be executed. When this key 524 is depressed, a copy mode display screen shown in FIG. 5 is displayed. In the example shown in FIG. 5, A4 is designated as a copy sheet and a single copy of an equal magnification at 100% is designated. Reference numeral 530 represents a message display field. In this example, a message "ready to copy" is displayed which indicates that a copy operation starts when an unrepresented start switch is depressed.

An extension function key 501 is depressed to set an operation mode such as both-side copy, multi-copy, move, binding margin set, and frame erase. An image mode key 502 is used for setting an operation mode such as meshing, shading, trimming, and masking of each copy image. A user mode key 503 is used for registering a mode memory and setting a standard mode screen. An applied zoom key 504 is used for entering a mode of independently changing a magnification factor of X and Y directions of an original or a zoom program mode of calculating a magnification factor from an original size and a copy size.

An M1 key 505, an M2 key 506 and an M3 key 507 are depressed when a mode memory registered for respective keys is called. An option key 509 is used for setting an optional function such as a film projector for directly copying a film.

A sorter key 510 is used for setting which of a mechanical sorter and an electronic sorter is used and setting a mode such as sort and group of the sorter. A mixed original key 511 is depressed when setting both A4 and A3 size originals or B5 and B4 size originals to the original feeder.

A direct key 512 is depressed when a copy magnification factor is set to 100%. A reduce key 514 and an enlarge key 515 are depressed for reducing or enlarging a standard size. A sheet selection key 513 is depressed for selecting a copy sheet. Each time a density key 518 is depressed, an original is copied denser, and each time a density key 519 is depressed, an original is copied thinner. As a density display key 517 is depressed, the density display changes right and left in this key frame. An AE key 519 is depressed for an automatic density control in copying an original with a dense background color such as a newspaper.

A HiFi key 521 is depressed for copying an original having a large area of dense half-tone such as a photographic original. A character emphasis key 522 is depressed for emphasizing characters in an original containing characters. A guide key 523 is depressed when a function of some key is uncertain and an explanation thereof is required.

A fax key 525 is depressed for a fax operation. A file key 526 is depressed for outputting file data.

A printer key 527 is depressed for changing a print density or referring to print output results of a PDL image from a remote host computer.

The operation of the copier will be described with reference to FIG. 3, assuming that the electronic sorter was selected with the sorter key 510 and the printer key 527 was depressed and PDL data was sent from the host computer 400.

At Step S1 PDL data sent from th e host computer 400 is sequentially developed into bit map images and stored in the hard disk 304b of the electronic sorter unit 203, starting from the first page. The PDL data is sent from the host computer starting from the first page.

At Step S2 it is checked whether all pages have been stored in the hard disk 304b. If stored, at Step S8 the stored images are sequentially read and printed in a designated normal order by face-down or reverse order by face-up. This designation is realized by an operation on the display unit or by a command contained in PDL data sent from the host computer 400. The read and print operations are repeated the designated number of print sets. If the normal order by face-down is designated, the above-described flappers 154 and 157 and the like are operated to turn the face of each of printed sheets downward (in a reversed state), and the face-down sheets are discharged.

If all pages are still not stored at Step S2, then the flow advances to Step S3. At Step S3 it is checked whether the hard disk 304b is full. If not, the flow returns to Step S1. If full, the flow advances to Step S4.

If it is judged at Step S4 that the reverse order by face-up is designated for the requested PDL job, the flow advances to Step S6 whereat irrespective of this designation, one set of originals is printed in the normal order by face-down and thereafter the flow advances to Step S7.

If the normal order by face-down is designated for the requested PDL job, the flow advances to Step S5 whereat in accordance with the designated order, one set of originals is printed in the normal order and thereafter the flow advances to Step S7.

At Step S7, displayed on the message display field 530 of the display unit of the copier is an indication that only one set of originals was printed because the memory of the electronic sorter 203 became full. For example, a message "because of memory-full, only one set was printed" is displayed. In the case of the reverse order by face-up, additionally displayed on the message display field 530 is an indication that print order was changed to a normal order by face-down. For example, a message "sheets were discharged in face-down" is displayed. These messages may be supplied via the external interface processing unit 209 to the external host computer to display them on the display unit thereof.

After the above process, for the remaining pages not loaded in the hard disk 304b, PDL data sent from the host computer 400 is sequentially developed into bit map images and directly printed in face-down.

As described above, PDL data sent from the host computer 400 is developed into bit map images and temporarily stored in a memory such as the hard disk 304b of the electronic sorter. If printing in the reverse order by face-up is designated and the memory such as the hard disk becomes full before all pages are stored, then the images in the memory are all printed out in the normal order by face-down starting from the first page. Thereafter, PDL data of the remaining pages sent from the host computer 400 is sequentially developed in bit map images and directly printed in face-down. In this manner, it is possible to print the images of all pages in correct order. Furthermore, the print execution results can be informed to a user by displaying them on the display field of the image forming apparatus or on a display of the host computer.

In this embodiment, data sent from the external host computer 400 is processed. The invention is not limited only to this, but other image data generated in sequential page order may be used, such as image data received from a facsimile apparatus and image data read from an original 200. For example, the apparatus equipped with not RDF 180 but an ADF of the type that image data is read from the start page, can also be applied. In the above description, PDL data developed into bit map image data is stored in the hard disk. Instead, PDL data may be converted into intermediate codes independently of each page and stored in the hard disk.

The image forming apparatus and method and the information processing system and method of this invention, may be applied to a system constituted of a plurality of apparatuses or to a single apparatus. Obviously, the image forming apparatus and method and the information processing system and method of this invention, may be applied to the case wherein programs realizing the functions of this invention is supplied to a system or apparatus. In this case, the system or apparatus reads a storage medium storing such software programs realizing the functions of the invention to attain the same effects of the invention. It is not necessary for this invention to provide a mechanical sorter.

As described above, according to the invention, in the case of printing in the reverse order by face-up, when the storage capacity becomes full while image data is stored in a memory, the data stored in the memory is all output and printed in the face-down starting from the first page. The image data of the remaining pages is not stored in the memory but directly printed out in the face-down. Accordingly, cancelling a copy job as in the conventional case can be avoided or pages of incorrect order are prevented from being printed out. Therefore, output images in correct page order can be reliably obtained and the operation efficiency can be improved. Furthermore, a change of a job into the face-down starting from the first page is notified to a user by displaying such an effect on a display field of the image forming apparatus or on a screen of the host computer. Therefore, a paper discharge state can be reliably notified to the user and the user becomes free of unnecessary confusion.

In the first embodiment, when the memory capacity becomes full, only one set is printed irrespective of the number of designated sets. In a second embodiment, if a mechanical sorter is equipped, the number of designated sets allowed by the number of bins may be printed.

A third embodiment of the invention will be described. In this embodiment, FIGS. 1, 2 and 4 and others used for the first and second embodiments are applicable. The characteristic operation of this embodiment will be described below.

In a general copier, a plurality of originals are read in the order from the last page to the first page and thereafter printed, and the printed copies are discharged in face-up. However, in a digital copier with the above-described printer functions and facsimile functions, image data from a host computer or a partner facsimile apparatus is generally supplied in the order from the start page to the last page. In this case, if the image data is printed in the input page order and the printed copies are discharged in face-up, the final set of originals is in the reverse page order and a user is required to manually rearrange or sort the discharged copies. This problem occurs even if a copier without the above-described printer functions and facsimile functions is used, such as a copier capable of mounting a document feeder which feeds originals in the order from the start page to the last page.

In order to solve this problem, the image forming apparatus of this invention is provided with a sheet reverse mechanism at an upstream of the paper discharge port, namely, with the paper discharge flapper 154, flapper 157, transport path 155, rollers 162, 162a and 163, and the like. With this sheet reverse mechanism, if the original images are printed in the order from the start page to the last page, printed sheets are reversed and discharged to obtain copied sheets in a correct page order. However, a new problem of a lowered throughput occurs because some space between a sheet turned upside down with this sheet reverse mechanism and the next sheet is required in order to avoid collision of two sheets. This problem becomes conspicuous especially when a plurality of sets of the same originals are printed because of a number of consecutive printing.

Image data of all pages stored in a memory may be read and printed in the reverse order of the input page order. With this method, even if sheets are not reversed with the reverse mechanism, the discharged sheets are sorted in the correct page order. However, until the last page image data is stored, the image forming operation cannot be started. Therefore, throughput of a small amount of printing lowers. In addition, a memory of a large capacity used for only this method increases the apparatus cost considerably. Still further, a new problem occurs that printing is impossible when the memory becomes full.

The present invention solves the above problems. The characteristic operation of this invention will be described with reference to FIGS. 6, 7A and 7B. In the following description, it is assumed that image data is input in the page order of 1, 2, 3, . . . , n−1, n.

Figure 6:
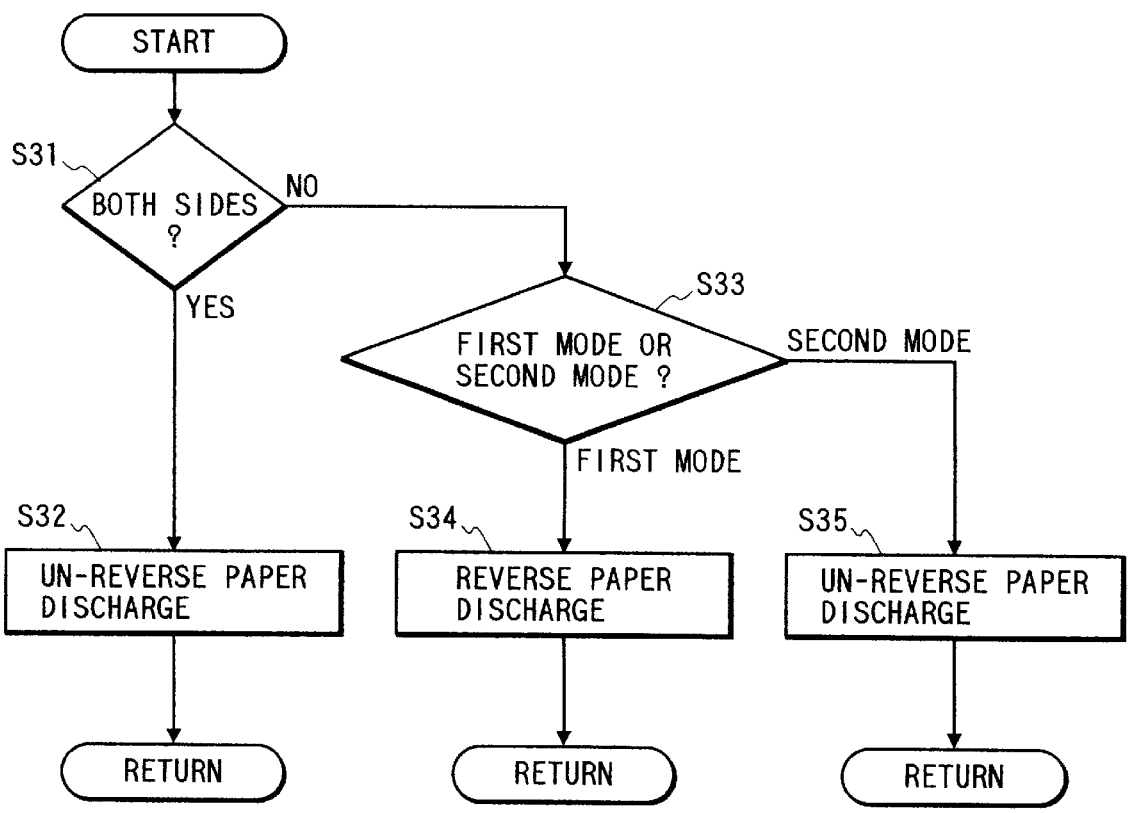

FIG. 6 is a flow chart illustrating the operation of determining whether the sheet reverse mechanism is used or not. In the following description, a mode of printing images in the page order of 1, 2, 3, . . . , n−1, n is called a first mode, and a mode of printing images in the page order of n, n−1, . . . , 3, 2, 1 is called a second mode. In the case of a both-side print, in one print method, after both sides of one sheet are recorded, both sides of the next sheet are recorded. In another print method, after one sides of a plurality of sheets are printed, the other sides thereof are printed. In still another print method, after one sides of a first set of several sheets are printed, both sides are alternately printed and other sides of a last set of several sheets are printed. In these print methods, sequentially discharging both-side printed sheets in the ascending order of page number is called the first mode, and sequentially discharging both-side printed sheets in the descending order of page number is called the second mode.

At Step S31 shown in FIG. 6 it is judged whether a both-side print is performed. If the both-side print is designated by a user panel setting or by a command from a host computer, it is judged as YES. In this case, at Step S32 irrespective of the first or second mode, it is decided that reversion with the sheet reverse mechanism is not performed.

In the case of one-side print, the flow advances from Step S31 to S33 whereat it is judged whether the first or second mode is selected. If the first mode, sheets are reversed with the sheet reverse mechanism and discharged (S34), whereas if the second mode, sheets are not reversed with the sheet reverse mechanism and discharged (S35).

Figure 7B:
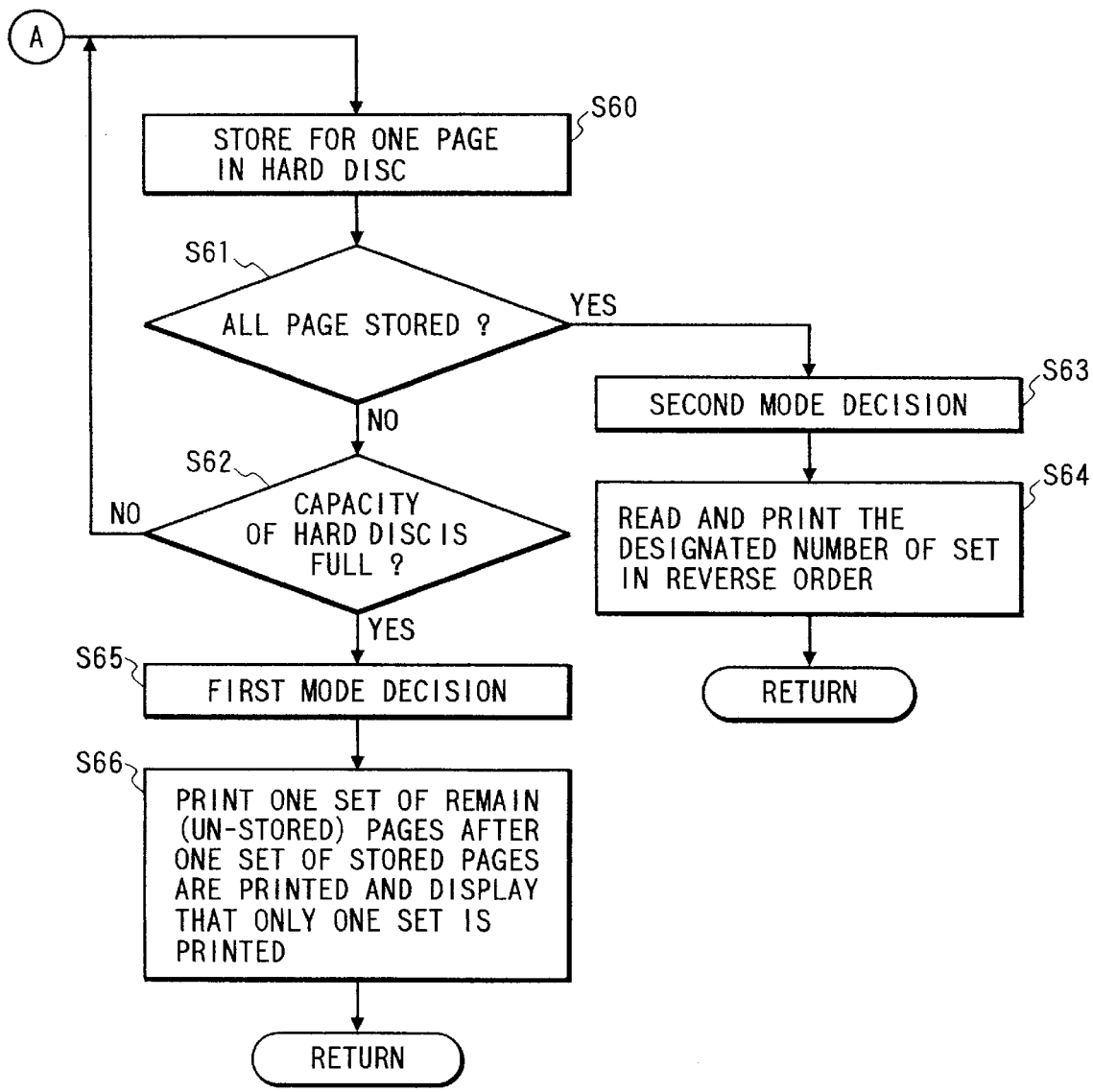

The process at Step S33 of selecting either the first or second mode will be described with reference to FIGS. 7A and 7B.

First at Step S51 it is judged whether input image data is stored in the hard disk. For example, this judgement is negated in the case where the number of copy (print) sets is "1" or in the case where a mechanical sorter is used even if the number of copy sets is plural. If this judgement is negated, the flow advances to Step S52 whereat the operation in the first mode is established and the input image data is printed in the input page order.

If the judgement at Step S51 is affirmative, it is judged at Step S53 whether the first mode is established. This judgement may be made as in the following. If the number of print sets is smaller than a predetermined number, the first mode is determined, whereas if the number is the predetermined number or larger, the second mode is determined. Alternatively, if the total number of print pages is smaller than a predetermined value, the first mode is determined, whereas if the total number is the predetermined number or lager, the second mode is determined. A user may decide this judgement.

If the judgement at Step S53 is affirmative, the flow advances to Step S54 to establish the first mode, and at Step S55 the image data of one page is stored and printed. If the input image data is PDL data from the host computer, this data is developed and then stored in the hard disk. If all pages are not still stored and printed (S56) and the capacity of the hard disk is not full (557), then the flow returns to Step S55 to process the next page. If all pages are stored at Step S56, image data of each page is read in the normal order (i.e., 1, 2, 3, . . . , n−1, n) and printed out at Step S58. This operation is repeated (i-1) times where i is the number of designated copy sets.

If the capacity of the hard disk becomes full before all pages are stored and printed, the flow advances from Step S57 to Step S59 to print each copy set without storing the remaining pages. In this case, irrespective of the number of designated copy sets, an indication that only one set was printed is displayed.

If the judgement at Step S53 is negated, input image data is stored in the hard disk at Step S60. If the input image data is PDL data supplied from the host computer 400, this data is developed into bit map images and stored starting from the first page into the hard disk 304b of the electronic sorter 203 (S61, S62).

At Step S61 it is checked whether all pages are stored in the hard disk 304b. If stored, the second mode is established at Step S63 and the stored images are read and printed in the reverse order (n, n−1, . . . , 3, 2, 1). The read and print operations are repeated the number of designated copy sets (S64). In this case, as described previously, the reverse mechanism is not used, and after printing each sheet, it is discharged without reversing (turning upside down).

If all pages are still not stored, the flow advances to Step S62 whereat it is judged whether the capacity of the hard disk 304b is full. If not full, the flow returns to Step S60, whereas if full, the flow advances to Step S65.

At Step S65 it is determined that the operation is established in the first mode. In this case, if the image data of m pages among n pages (m<n) is already stored, image data is printed in the order of 1, 2, 3, . . . , m−1, m and image data of m+1, m+2, . . . , n−1, n are printed without storing it in the hard disk. In this case, irrespective of the number of designated print sets, one set of respective pages is printed.

An indication that only one set was printed is displayed on the display unit 600 (S66).

If the input image data is PDL data sent from the host computer 400, a notice that only one set was printed is supplied at Steps S59 and S66 to the host computer 400 as print status.

As described above, image data such as image data developed from PDL data sent from the host computer 400 into bit map images and image data received from a facsimile apparatus or the like is temporarily stored in a memory such as the hard disk 304b of the electronic sorter and printed (second mode). If printing in the reverse order by face-up is designated and the memory such as the hard disk becomes full before all pages are stored, then the images in the memory are all printed out in the normal order by face-down starting from the first page (first mode). Thereafter, PDL data of the remaining pages sent from the host computer 400 is sequentially developed in bit map images and directly printed in face-down. In this manner, it is possible to print the images of all pages in correct order.

In this embodiment, data sent from the external host computer 400 is processed. The invention is not limited only to this, but other image read from the original may be used with the same advantageous effects.

The image forming apparatus and method and the information processing system and method of this invention, may be applied to a system constituted of a plurality of apparatuses or to a single apparatus. Obviously, the image forming apparatus and method and the information processing system and method of this invention, may be applied to the case wherein programs realizing the functions of this invention is supplied to a system or apparatus. In this case, the system or apparatus reads a storage medium storing such software programs realizing the functions of the invention to attain the same effects of the invention.

As described above, according to the invention, even when the storage capacity becomes full while image data is stored in a memory, cancelling a copy job as in the conventional case can be avoided or pages of incorrect order are prevented from being printed out. Therefore, output images in correct page order can be reliably obtained and the operation efficiency can be improved.

The invention is not limited only to the above embodiments, but various modifications are possible without departing from the scope of the appended claims.

What is claimed is:

1. An image forming apparatus comprising:
   a storage unit for storing image data;
   print means for printing the image data on a sheet;
   ejection means for ejecting a printed sheet;
   first control means for controlling said storage unit to temporarily store image data in a first page order, reading the image data stored in said storage unit in a second page order, the first and second page orders being reverse to each other, controlling said print means to print the read image data on a sheet, and controlling said ejection means to eject the sheet with a printed face of the sheet being turned upward;

second control means for reading the image data stored in said storage unit in the first page order, controlling said print means to print the read image data, and controlling said ejection means to eject the sheet with the printed face being turned downward, if the capacity of said storage unit becomes full while the image data is stored by said first control means in said storage unit; and third control means for controlling said print means to print the image data of a remaining page not stored in said storage unit in the first page order, and controlling said ejection means to eject the sheet with the printed face being turned downward, without storing the image data in said storage unit, after a process is executed by said second control means.

2. An image forming apparatus according to claim 1, further comprising:

developing means for developing data sent from an external apparatus into bit map image data; and a communication controller and a hard disk provided in said storage unit, the developed bit map image data being written in the hard disk in accordance with a command from said communication controller.

3. An image forming method comprising the steps of:

temporarily storing image data into a storage unit in a first page order, reading the image data stored in the storage unit in a second page order, the first and second page orders being revers to each other, printing the read image data on a sheet, and ejecting the sheet with a printed face of the sheet being turned upward;

reading the image data stored in the storage unit in the first page order, printing the read image data, and ejecting the sheet with the printed face being turned downward, if the capacity of the storage unit becomes full while the image data is stored in the storage unit; and printing the image data of a remaining page not stored in the storage unit in the first page order, and ejecting the sheet with the printed face being turned downward, without storing the image data in the storage unit.

4. An image forming method according to claim 3, further comprising the steps of:

developing data sent from an external apparatus into bit map image data; and providing a communication controller and a hard disk in the storage unit, and writing the developed bit map image data in the hard disk in accordance with a command from the communication controller.

5. An information processing system for receiving data sent from a master apparatus at a slave apparatus, comprising:

developing means provided in the slave apparatus for developing the data sent from the master apparatus into a bit map image;

first control means for temporarily storing the developed data into a storage unit in a first page order, reading the data stored in the storage unit in a second page order, the first and second page orders being reverse to each other, printing the read data on a sheet, and ejecting the sheet with a printed face of the sheet being turned upward;

second control means for reading the data stored in the storage unit in the first page order, printing the read data, and ejecting the sheet with the printed face being turned downward, if the capacity of the storage unit becomes full while the data is stored by said first control means in the storage unit; and third control means for printing the data of a remaining page not stored in the storage unit in the first page order, and ejecting the sheet with the printed face being turned downward, without storing the data in the storage unit, after a process is executed by said second control means.

6. An information processing system according to claim 5, wherein the master apparatus is a host computer and the slave apparatus is a digital copier with an electronic sorting function.

7. An information processing system according to claim 5, wherein the storage unit includes a communication controller and a hard disk provided in the storage unit, the data being written in the hard disk in accordance with a command from the communication controller.

8. An information processing method for receiving data sent from a master apparatus at a slave apparatus, comprising the steps of:

developing the data sent from the master apparatus into a bit map image at the slave apparatus;

temporarily storing the developed data into a storage unit in a first page order, reading the data stored in the storage unit in a second page order, the first and second page orders being reverse to each other, printing the read data on a sheet, and ejecting the sheet with a printed face of the sheet being turned upward;

reading the data stored in the storage unit in the first page order, printing the read data, and ejecting the sheet with the printed face being turned downward, if the capacity of the storage unit becomes full while the data is stored in the storage unit; and printing the data of a remaining page not stored in the storage unit in the first page order, and ejecting the sheet with the printed face being turned downward, without storing the data in the storage unit.

9. An information processing method according to claim 8, wherein the master apparatus is a host computer and the slave apparatus is a digital copier with an electronic sorting function.

10. An information processing method according to claim 8, wherein the storage unit includes a communication controller and a hard disk provided in the storage unit, the data being written in the hard disk in accordance with a command from the communication controller.

11. An image forming apparatus according to claim 1, further comprising:

first display control means for displaying executions of said second and third control means on a display unit provided in the image processing apparatus.

12. An image forming apparatus according to claim 11, further comprising:

developing means for developing data sent from an external apparatus into bit map image data; and a communication controller and a hard disk provided in the storage unit, the developed bit map image data being written in the hard disk in accordance with a command from said communication controller.

13. An image forming method according to claim 3, further comprising the step of:

displaying execution results on a display unit provided in an image processing apparatus.

14. An image forming method according to claim 13, further comprising the steps of:

developing data sent from an external apparatus into bit map image data; and writing the developed bit map image data in a hard disk.

15. An information processing system according to claim 5, further comprising:

second display control means for displaying executions of said second and third control means on a display unit provided in the slave apparatus.

16. An information processing system according to claim 15, wherein the master apparatus is a host computer and the slave apparatus is a digital copier with an electronic sorting function.

17. An information processing system according to claim 5, further comprising third display control means for displaying executions of said second and third control means on a display unit provided in the master apparatus.

18. An information processing method according to claim 8, further comprising the step of:

displaying execution results on a display unit provided in the slave apparatus.

19. An information processing method according to claim 18, wherein the master apparatus is a host computer and the slave apparatus is a digital copier with an electronic sorting function.

20. An information processing method according to claim 8, further comprising the step of:

displaying execution results on a display unit provided in the master apparatus.

21. An image forming apparatus comprising:

reversing means for reversing a sheet with an image formed thereon and discharging the reversed sheet;

determining means for determining whether the sheet with the image formed thereon is reversed or not reversed by said reversing means before the sheet is discharged; and page order control means including a first mode of forming images of a plurality of pages in a first page order and a second mode of forming images of a plurality of pages in a second page order different from the first page order, wherein in accordance with whether the apparatus operates in the first mode or in the second mode, said determining means determines whether the sheet with the image formed thereon is reversed or not reversed by said reversing means before the sheet is discharged.

22. An image forming apparatus according to claim 21, further comprising storage means for storing image data, wherein in an event that image data of a plurality of pages is input in an input page order, in the first mode, images are formed in the input page order, and, in the second mode, the input image data of the plurality of pages is stored in said storage means and read in a page order different from the input page order to form images.

23. An image forming apparatus according to claim 22, wherein said page order control means selects the first mode if image data of all pages cannot be stored in said storage means.

24. An image forming apparatus according to claim 22, wherein the image forming apparatus is provided with a function of storing image data of a plurality of pages and repeating a plurality of times an operation of reading and printing image data one page after another in a predetermined page order, if a plurality of copy sets of the image data of the plurality of pages are formed.

25. An image forming apparatus according to claim 21 further comprising judging means for judging whether image data of a plurality of pages is printed on both sides of a sheet, wherein said determining means determines that a sheet is to be discharged with an image formed without reversing the sheet with said reversing means, irrespective of the first or second mode, if said judging means judges that images are formed on both sides of the sheet.

26. An image forming method for an image forming apparatus having reversing means for reversing a sheet with an image formed and discharging the reversed sheet, the method comprising the steps of:

determining whether the sheet with an image formed is reversed or not reversed with said reversing means before the sheet is discharged; and forming image in one of first and second modes, the first mode forming images of a plurality of pages in a first page order and a second page mode forming images of a plurality of pages in a second page order different from the first page order, wherein in accordance with whether the apparatus operates in the first mode or in the second mode, said determining step determines whether the sheet with an image formed is reversed or not reversed with said reversing means before the sheet is discharged.

27. An image forming method according to claim 26, wherein the image forming apparatus is provided with storage means for storing image data, and in an event that image data of a plurality of pages in input in an input page order, in the first mode, images are formed in the input page order, and, in the second mode, the input image data of the plurality of pages is stored in said storage means and read in a page order different from the input page order to form images.

28. An image forming method according to claim 27, wherein said image forming step selects the first mode if image data of all pages cannot be stored in said storage means.

29. An image forming method according to claim 27, wherein the image forming apparatus is provided with a function of storing image data of a plurality of pages and repeating a plurality of times an operation of reading and printing image data one page after another in a predetermined page order, if a plurality of copy sets of the image data of the plurality of pages are formed.

30. An image forming method according to claim 26, further comprising the step of judging whether image data of a plurality of pages is printed on both sides of a sheet, wherein said determining step determines that a sheet is to be discharged with an image formed without reversing the sheet with said reversing means, irrespective of the first or second mode, if said judging step judges that images are formed on both sides of the sheet.

31. An information processing system according to claim 6, wherein the storage unit includes a communication controller and a hard disk provided in the storage unit, the data being written in the hard disk in accordance with a command from the communication controller.

32. An information processing method according to claim 9, wherein the storage unit includes a communication controller and a hard disk provided in the storage unit, the data being written in the hard disk in accordance with a command from the communication controller.

* * * * *

UNITED STATES PATENT AND TRADEMARK OFFICE
CERTIFICATE OF CORRECTION

PATENT NO. : 6,034,783
DATED : March 7, 2000
INVENTOR(S) : MASAYUKI HONMA, ET AL.

It is certified that error appears in the above-indentified patent and that said Letters Patent is hereby corrected as shown below:

COLUMN 8

Line 22, "th e" should read --the--.

COLUMN 11:

Line 61, "the" should read --for the--.

COLUMN 13:

Line 31, "revers" should read --reverse--.

COLUMN 15:

Line 14, "comprising" should read --comprising:--.

Signed and Sealed this

Third Day of April, 2001

*Attest:*

NICHOLAS P. GODICI

*Attesting Officer*     Acting Director of the United States Patent and Trademark Office